United States Patent
Iguchi et al.

(10) Patent No.: US 8,537,383 B2
(45) Date of Patent: Sep. 17, 2013

(54) DECOLORING DEVICE AND FUNCTION MANAGEMENT METHOD

(75) Inventors: Ken Iguchi, Shizuoka-ken (JP); Takahiro Kawaguchi, Shizuoka-ken (JP); Isao Yahata, Shizuoka-ken (JP); Hiroyuki Taguchi, Shizuoka-ken (JP); Hiroyuki Tsuchihashi, Shizuoka-ken (JP); Hiroyuki Taki, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 232 days.

(21) Appl. No.: 13/191,142

(22) Filed: Jul. 26, 2011

(65) Prior Publication Data

US 2012/0026531 A1 Feb. 2, 2012

Related U.S. Application Data

(60) Provisional application No. 61/368,614, filed on Jul. 28, 2010, provisional application No. 61/368,616, filed on Jul. 28, 2010, provisional application No. 61/368,618, filed on Jul. 28, 2010, provisional application No. 61/372,435, filed on Aug. 10, 2010.

(51) Int. Cl.
*G06F 15/00* (2006.01)

(52) U.S. Cl.
USPC .................................................. 358/1.14

(58) Field of Classification Search
USPC .................................................. 358/1.14
See application file for complete search history.

(56) References Cited

U.S. PATENT DOCUMENTS

| | | | |
|---|---|---|---|
| 2009/0073507 A1* | 3/2009 | Fukuda | 358/474 |
| 2010/0118361 A1 | 5/2010 | Iguchi | |
| 2010/0321457 A1 | 12/2010 | Kawaguchi et al. | |

FOREIGN PATENT DOCUMENTS

JP 10214005 8/1998

* cited by examiner

*Primary Examiner* — Saeid Ebrahimi Dehkordy
(74) *Attorney, Agent, or Firm* — Patterson & Sheridan, LLP

(57) ABSTRACT

When the presence or absence of a malfunction is respectively determined in a decoloring section or a separation device, and it is determined that either the decoloring section or the separation device is malfunctioning, only the other is executable.

15 Claims, 16 Drawing Sheets

DECOLORING DEVICE AND FUNCTION MANAGEMENT METHOD

CROSS-REFERENCE TO RELATED APPLICATION(S)

This application is based upon and claims the benefit of priority from: U.S. provisional application 61/368,614, filed on Jul. 28, 2010; U.S. provisional application 61/368,616, filed on Jul. 28, 2010; U.S. provisional application 61/368,618, filed on Jul. 28, 2010; and U.S. provisional application 61/372,435, filed on Aug. 10, 2010; the entire contents all of which are incorporated herein by reference.

FIELD

Embodiments described herein relate generally to a decoloring device that decolors an image that is image formed on a sheet by a decolorable colorant that is color erasable by applying predetermined decoloring.

BACKGROUND

In the related art, a decoloring device that includes a decoloring section that decolors an image that is formed on a sheet of paper and a determination section such as a scanner that determines whether or not the decoloring is applied properly and that determines whether or not the sheet is reusable is known.

In the decoloring device of the related art described above, there is a problem that, when the decoloring section is able to operate normally but the above-described determination section is malfunctioning, the device as a whole is determined to be unable to operate, and even the decoloring section that is able to operate normally is not able to be used.

DETAILED DESCRIPTION

Generally, according to an embodiment, a decoloring device includes a first sheet carrying path, a decoloring section, a second sheet carrying path, a scanner, a flapper, a route control section, a malfunction determination section, and a function management section.

The first sheet carrying path leads a sheet that is supplied from a supply opening to a discharge opening.

The decoloring section decolors the color of an image that is formed by a decolorable colorant on the sheet that is carried on the first sheet carrying path.

The second sheet carrying path is a carrying path that diverges from the first sheet carrying path, and leads the sheet that the decoloring section decolors to a separation device that separates and discharges the sheet to one of a plurality of discharge destinations.

The flapper switches a carrying destination of the sheet that the decoloring section decolors to the discharge opening on the first sheet carrying path or the separation device.

The route control section switches, by switching the flapper, the carrying destination of the sheet that passes through the decoloring section to either the discharge opening or the separation device.

The malfunction determination section determines the presence or absence of a malfunction in each of the decoloring section and the separation device.

The function management section causes, when the malfunction determination section determines that one of the decoloring section and the separation device is malfunctioning, only the other to be executable.

First Embodiment

P1B105017-1 Function Separation when Malfunctioning

First, a First Embodiment will be described with reference to the drawings.

Figure 1:
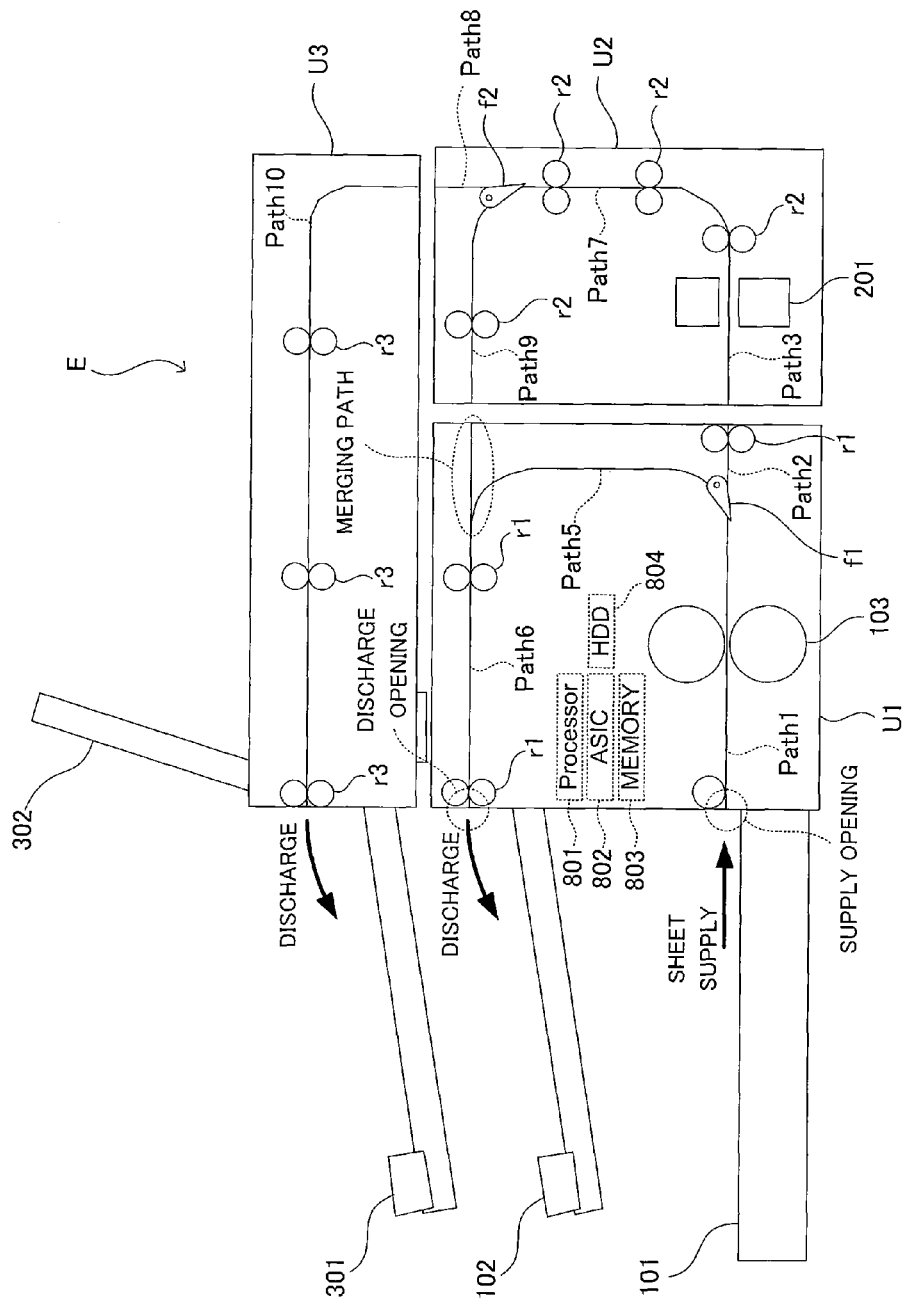
FIG. 1 illustrates a vertical cross-sectional diagram of an outline configuration of a decoloring device E of a First Embodiment.

FIG. 1 illustrates a vertical cross-sectional diagram of an outline configuration of a decoloring device E of the First Embodiment.

The decoloring device E includes three units of a unit U1, a unit U2, and a unit U3. The unit U1 has a role of being a main body of the decoloring device, and includes basic functions of performing decoloring on a sheet.

The unit U2 is able to be attached on or detached from a back side of the unit U1 (side on which a discharge tray is not provided), and the unit U3 is able to be attached on or detached from upper portions of the units U1 and U2. Various known mechanisms are able to be used as a mechanism that couples the units to be detachably attached.

The unit U1 includes a sheet carrying path Path1, a sheet carrying path Path2, a sheet carrying path Path5, a sheet carrying path Path6, a flapper f1, a sheet supply tray 101, a discharge tray 102, and a decoloring section 103. The unit U1 is able to act as the decoloring device by the unit U1 alone.

A sheet that is a carrying object is supplied from the sheet supply tray 101 to the sheet carrying path Path1, and the sheet carrying path Path1 diverges into the sheet carrying path Path2 and the sheet carrying path Path5. The flapper f1 switches to whichever of the sheet carrying path Path2 and the sheet carrying path Path5 the sheet that is carried on the sheet carrying path Path1 is led. Further, the sheet that is carried on the sheet carrying path Path5 merges with the sheet carrying path Path6. Sheets that pass through the sheet carrying path Path6 are discharged and sequentially loaded onto the discharge tray 102.

The sheet carrying path Path1 and the sheet carrying path Path2 are straight passes that are consecutive. The decoloring section 103 is arranged to the further downstream side of the sheet supply tray 101 in the sheet carrying direction of the sheet carrying path Path1 and on the further upstream side from a separation point of the sheet carrying paths.

The decoloring section 103 decolors, by heating a transported sheet at a predetermined decoloring temperature, an image that is image formed on the sheet by a decolorable colorant.

The unit U2 includes a sheet carrying path Path3, a sheet carrying path Path7, a sheet carrying path Path8, a sheet carrying path Path9, a scanner 201, and a flapper f2.

The sheet that is led to the sheet carrying path Path2 by the flapper f1 in the unit U1 enters the sheet carrying path Path3 of the unit U2.

The sheet carrying path Path3 connects to the sheet carrying path Path7 that is a perpendicular path.

The sheet carrying path Path1, the sheet carrying path Path2, the sheet carrying path Path5, and the sheet carrying path Path6 correspond to "the first sheet carrying path" that leads a sheet that is supplied from the sheet supply tray 101 to the supply opening to the discharge opening. Further, the sheet carrying path Path2 is equivalent to "the second sheet carrying path".

The sheet carrying path Path7 diverges into the sheet carrying path Path8 and the sheet carrying path Path9 at the separation point, and is able to carry a sheet in two directions. The flapper f2 switches to whichever direction out of the sheet carrying path Path8 and the sheet carrying path Path9 a sheet is led.

The sheet that is led to the sheet carrying path Path8 enters a sheet carrying path Path10 of the unit U3, the sheet that is led to the sheet carrying path Path9 enters the sheet carrying path Path6 of the unit U1, and the sheets are discharged onto the discharge tray 102.

The scanner 201 is arranged on the further downstream side of a sheet entry opening from the unit U1 in the sheet carrying direction of the sheet carrying path Path3 (further downstream side from the decoloring section) and on the further upstream side from the separation point of the sheet carrying path Path3.

In such a manner, a PROCESSOR 801 is able to determine the outcome of decoloring by the scanner 201 (image reading section) reading a left-over image (decoloring state) on a sheet that the decoloring section 103 decolors, or the like.

The unit U3 includes the sheet carrying path Path10, a discharge tray 301, and a display section 302. The display section 302 is, for example, able to be configured by a touch panel display that is able to perform operation inputs such as button operations and screen display.

A sheet that is led to the sheet carrying path Path8 by the flapper f2 (second flapper) in the unit U2 enters the sheet carrying path Path10 of the unit U3. Here, the flapper f2 switches the sheet carrying destination to any of a plurality of carrying destinations of a sheet that is led from the unit U1. That is, the unit U2 includes a function of "the separation device" that separates and discharges a sheet to any of a plurality of discharge destinations.

A sheet that enters the sheet carrying path Path10 is discharged and loaded onto the discharge tray 301.

The display section 302 is a touch panel display that includes, as well as displaying information relating to a processing content in the decoloring device, a function of receiving control inputs by the user. Of course, there is no need for the screen display function and the control input receiving function to be integrally provided on the display section 302, and the display section 302 may have a configuration of including, for example, buttons for operation inputs and a display only for displaying.

Each of the sheet carrying paths Path1 to Path 10 includes a plurality of carrying rollers for nipping and carrying a sheet. Here, a carrying roller group that is provided to the unit U1 is r1, a carrying roller group that is provided to the unit U2 is r2, and a carrying roller group that is provided to the unit U3 is r3.

Furthermore, the decoloring device E includes the PROCESSOR 801, an ASIC (Application Specific Integrated Circuit) 802, a MEMORY 803, and an HDD (Hard Disk Drive) 804.

The PROCESSOR 801 controls various types of processing that are performed in the decoloring device E such as controlling ON and OFF states or carrying speed of each of the plurality of carrying rollers r1, r2, and r3 that is provided respectively to each of the sheet carrying paths Path1 to Path10, driving of each of the flappers f1 and f2, sheet carrying speed or temperature control in the decoloring section 103, control of image reading by scanners 202 and 203, and the like.

In the decoloring device E of the present embodiment, the PROCESSOR 801 also includes a role of realizing various functions by executing a program that is stored in the MEMORY 803, the HDD 804, or the like. Here, needless to say, the PROCESSOR 801 is able to be realized by a CPU (Central Processing Unit) or an MPU (Micro Processing Unit) that is able to execute the same calculations. Further, in the same way, a memory device such as, for example, a flash memory, is able to substitute the HDD 804.

The MEMORY 803 is able, for example, to be configured by a RAM (Random Access Memory), a ROM (Read Only Memory), a DRAM (Dynamic Random Access Memory), and an SRAM (Static Random Access Memory), a VRAM (Video RAM), a flash memory, or the like, and includes a role of storing various pieces of information and programs that are used in the decoloring device E.

The HDD 804 (memory section) stores image data that the scanner 202 or the scanner 203 reads from a sheet.

By such a configuration, it is possible to perform, according to results of the decoloring in the decoloring section 103, separation discharge such as, for example, discharging a sheet that is not adequately decolored to the discharge tray 102, discharging a sheet that is adequately decolored to the discharge tray 301, and the like.

Figure 2:
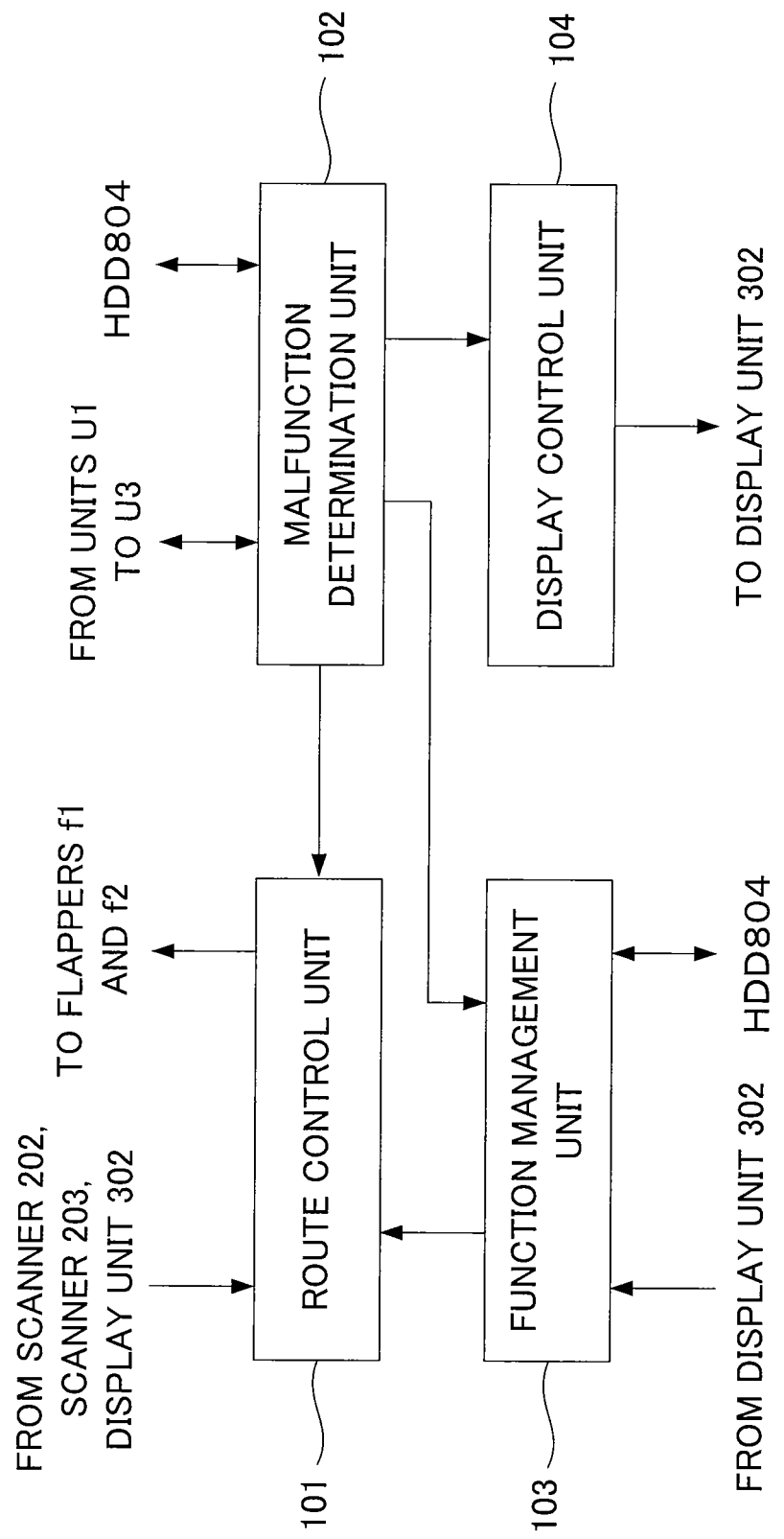
FIG. 2 illustrates a functional block diagram of functions that the decoloring device E of the First Embodiment includes.

FIG. 2 illustrates a functional block diagram of the functions that the decoloring device E of the First Embodiment includes.

The decoloring device E of the First Embodiment includes a route control section 101, a malfunction determination section 102, a function management section 103, and a display control section 104.

The route control section 101 switches, by switching the flapper f1, the carrying destination of a sheet that the decoloring section decolors to either the discharge opening or the unit U2 (separation device).

The malfunction determination section 102 determines the presence or absence of a malfunction in each of the decoloring section 103 and the unit U2 (separation device).

The malfunction determination section 102 determines, when communication that is usually established between the units is notable to be established, when an error code that is transmitted from a malfunctioning unit is received, when a fact that there is a malfunction is recorded as a log in the HDD 804, or the like, that a specific unit or a specific function is malfunctioning.

The function management section 103 causes, when the malfunction determination section 102 determines that one of the decoloring section 103 and the unit U2 (separation device) is malfunctioning, only the other to be executable.

When the malfunction determination section 102 determines that the separation device is malfunctioning, the route control section 101 switches the flapper f1 such that a sheet that the decoloring section 103 decolors is carried toward the discharge opening and prohibits entry of the sheet into the second sheet carrying path (unit U2).

The route control section 101 switches the flapper f1, when the malfunction determination section 102 determines that the decoloring section 103 is malfunctioning, such that a sheet that is carried within the first sheet carrying path is carried toward the unit U2 (separation device).

The display control section 104 causes, when the malfunction determination section 102 determines that one of the decoloring section 103 and the unit U2 (separation device) is malfunctioning, at least one function that is executable without receiving the influence of the malfunction of the malfunction location to be displayed on the display section 302.

The function management section 103 causes, when an operation input to select any of the one or more executable functions that the display control section 104 causes to be displayed on the display section 302 is received, only the selected function to be executed.

Figure 3:
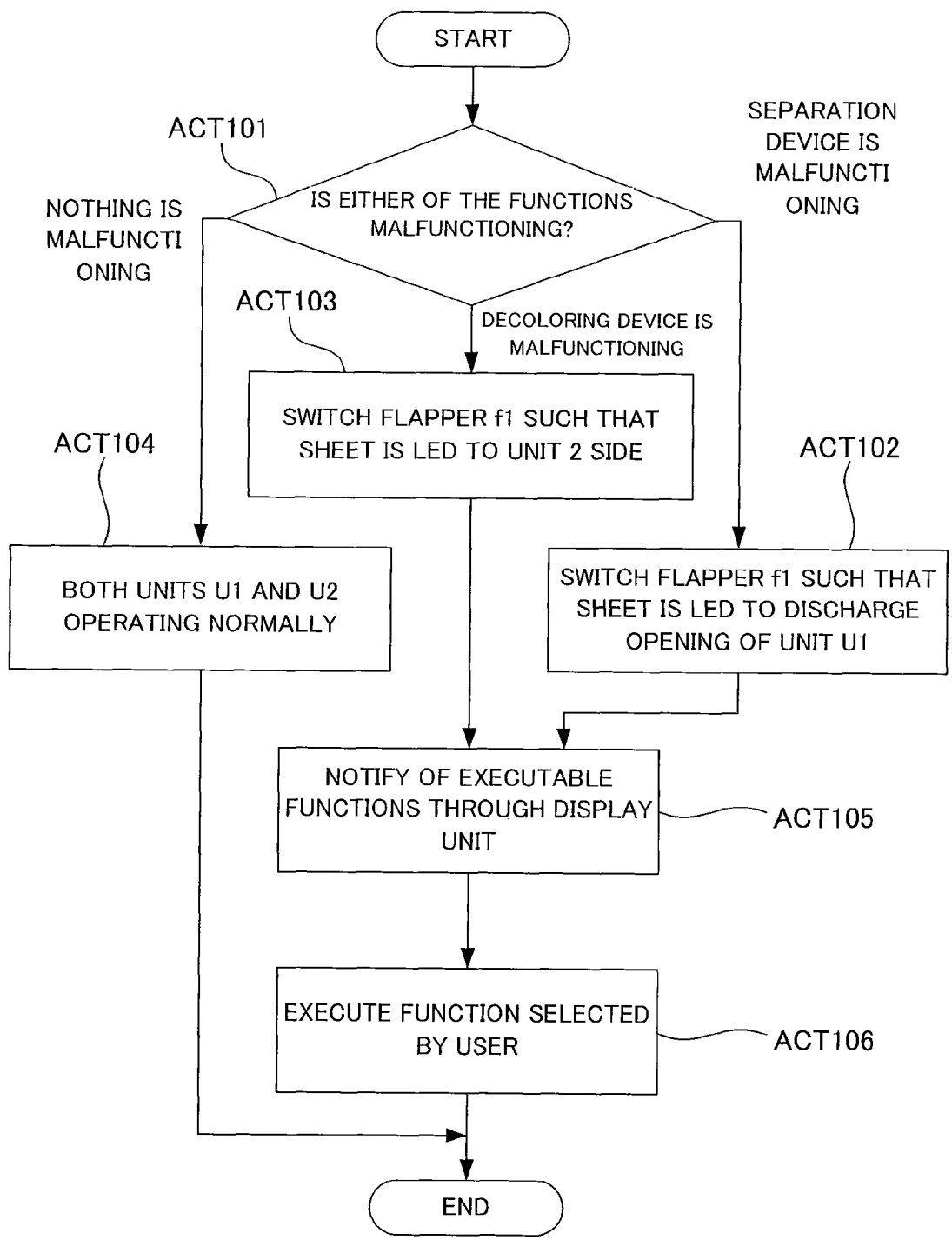
FIG. 3 illustrates a flowchart for describing the flow of processing (function management method) in the decoloring device E.

FIG. 3 illustrates a flowchart for describing the flow of processing (function management method) in the decoloring device E.

The PROCESSOR 801 determines the presence or absence of a malfunction in each of the decoloring section 103, the unit U1, the unit U2 (separation device), and the unit U3 (ACT 101)

Figure 4:
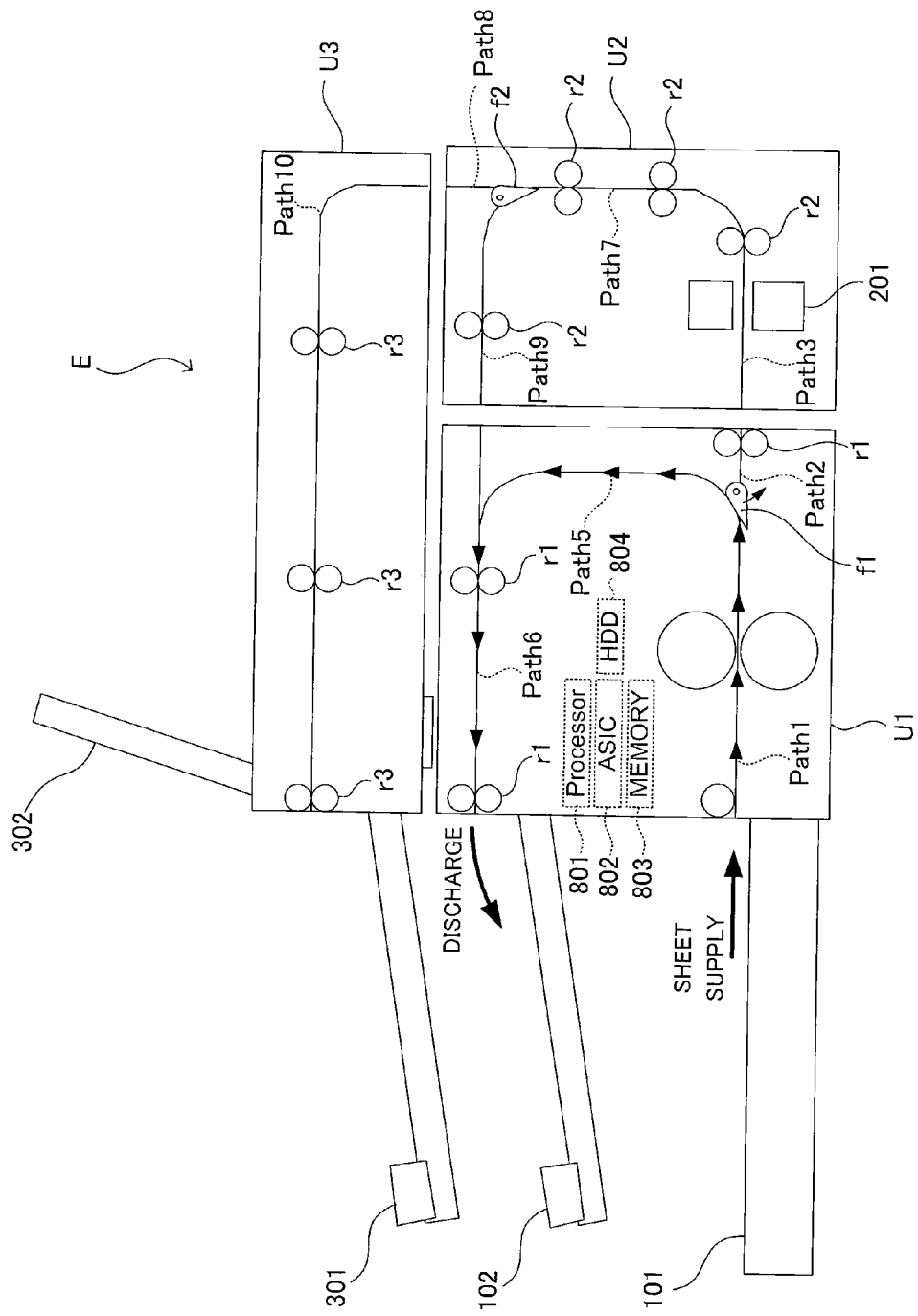
FIG. 4 illustrates a diagram of a state of switching a flapper f1.

When the malfunction determination section 102 determines that the unit U2 (separation device) is malfunctioning (ACT 101, separation device is malfunctioning), the PROCESSOR 801 switches the flapper f1 such that a sheet that the decoloring section 103 decolors is carried toward the discharge opening (refer to FIG. 4) and prohibits entry of the sheet into the second sheet carrying path (unit U2) (ACT 102).

Figure 5:
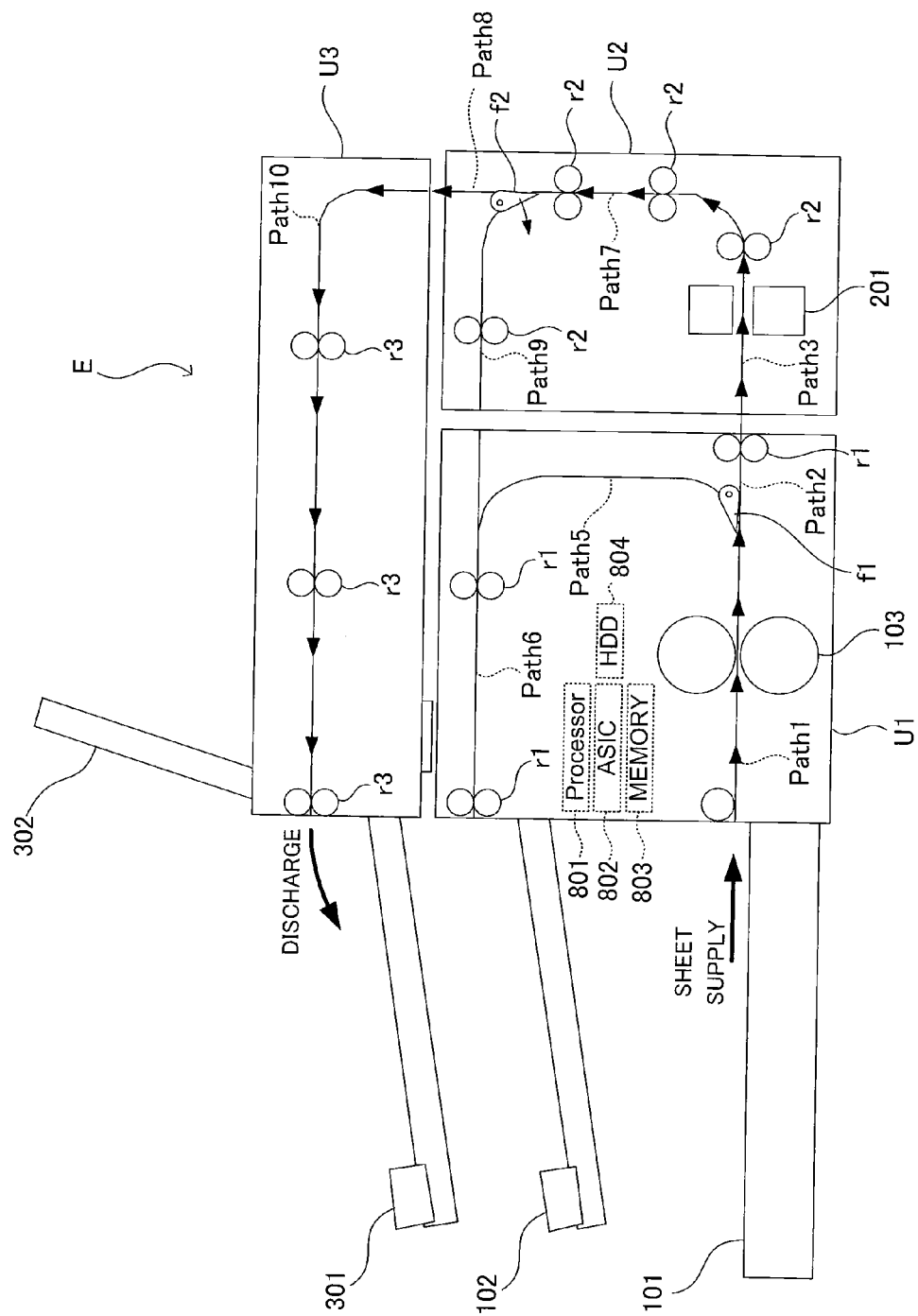
FIG. 5 illustrates a diagram of another state of switching the flapper f1.

On the other hand, when the malfunction determination section 102 determines that the decoloring section 103 is malfunctioning (is not heatable, or the like) (ACT 101, decoloring section is malfunctioning), the PROCESSOR 801 switches the flapper f1 such that a sheet that is carried within the first sheet carrying path is carried toward the unit U2 (separation device) (ACT 103). In this case, the sheet is not decolored but separated at the unit U2 (see FIG. 5). This is a process that is effective when, for example, a bundle of sheets that are decolored are loaded onto the sheet supply tray 101, and only scanning (saving an image data) and/or separation based on the decoloring state of each of such sheets is to be performed.

In addition, although it is conceivable that sheets are separated and discharged to the sheet discharge tray 102 depending on result of the separation by the unit U2, for example, when there is a malfunction in the driving of the carrying rollers r1 of the unit U1, even sheets that would ordinarily be separated and discharged to the sheet discharge tray 102 are discharged to the sheet discharge tray 301. In such a case, although separating and discharging are not in reality possible, determination of the outcome of the decoloring on each sheet is able to be executed. The PROCESSOR 801 is able to screen display result of such an outcome determination on the display section 302.

In such a manner, when the malfunction determination section 102 determines that one of the decoloring section 103 and the unit U2 (separation device) is malfunctioning, the PROCESSOR 801 causes only the other to be executable. Here, if neither is malfunctioning, the PROCESSOR 801 causes a sheet that is decolored to enter the unit U2 as an ordinary operation, and causes separation to be executed in the unit U2 (ACT 104).

The PROCESSOR 801 causes, when the malfunction determination section 102 determines that one of the decoloring section 103 and the unit U2 (separation device) is malfunctioning, at least one function that is executable without receiving the influence of the malfunction of the malfunctioning location to be displayed on the display section 302 (ACT 105).

The PROCESSOR 801 causes, when an operation input to select any of the one or more executable functions that the display control section 104 causes to be displayed on the display section 302 is received, only the selected function to be executed (ACT 106).

Each operation of the processing in the decoloring device E described above is realized by the processor 801 executing a program that is stored in the MEMORY 803.

Furthermore, a computer that configures the decoloring device is able to include a program to cause each of the operations described above to be executed. Although a case when the program for realizing the functions of the exemplary embodiments is recorded in a memory region provided in the device in advance is exemplified in the present embodiment, without limiting thereto, a similar program may be downloaded from a network onto the device, or a similar program that is stored on a computer-readable memory medium may be installed on the device. The memory medium may be of any form as long as the memory medium is able to store a program and is able to be read by a computer. Specifically, an internal memory device that is built into a computer such as a ROM or a RAM, a transportable memory medium such as a CD-ROM or a flexible disk, a DVD disc, a magnetic optical disc, or an IC card, a database that retains computer programs, other computers and the databases thereof, a transmission medium on a line, or the like may be the memory medium. Further, functions that are obtained by installing or downloading in advance in such a manner may be functions that are realized by cooperating with an OS (Operating System) within the device.

Here, a program may be an execution module in which a portion or the whole thereof is dynamically generated.

Furthermore, needless to say, at least a portion of the various types of processing that are realized by causing the processor to execute a program in each of the embodiments described above are able to be executed as a circuit by the ASIC 802.

In addition, in the present embodiment, although a configuration in which the unit U1 includes all of the PROCESSOR 801, the ASIC 802, the MEMORY 803, and the HDD 804 is exemplified, the embodiment is not limited thereto. That is, as long as the functions that are included in the decoloring device E are able to be realized by the decoloring device E as a whole, the functions may be arranged on any unit, and the units U2 and U3 may include the same processing functions as the unit U1.

In such a manner, in the decoloring device E of the First Embodiment, even when, for example, there arises a malfunction in the determination function of the scanner 201 or the like in the unit U2 or in the carrying function of the flapper f2 or the like, since the unit U1 is able to realize the functions of the decoloring device independently, the functions of the decoloring device are able to be continuously executed.

Second Embodiment

P1B105016-1 Additional Discharge Tray Mechanism

Next, a Second Embodiment will be described with reference to the drawings. The Second Embodiment is a modification example of the First Embodiment, and the basic device configurations thereof are the same. Below, parts that have the same functions as described in the First Embodiment are given the same reference numerals, and the description thereof will be omitted.

In the related art, a decoloring device that includes a decoloring section that decolors an image that is formed on a sheet of paper and a determination section such as a scanner that determines whether or not the decoloring is applied properly and that determines whether or not the sheet is reusable is known.

However, there is a problem that, when a greater number of sheets are decolored and a large number of the decolored sheets are to be loaded on a discharge tray, an additional purchase of a large device is necessary.

Figure 6:
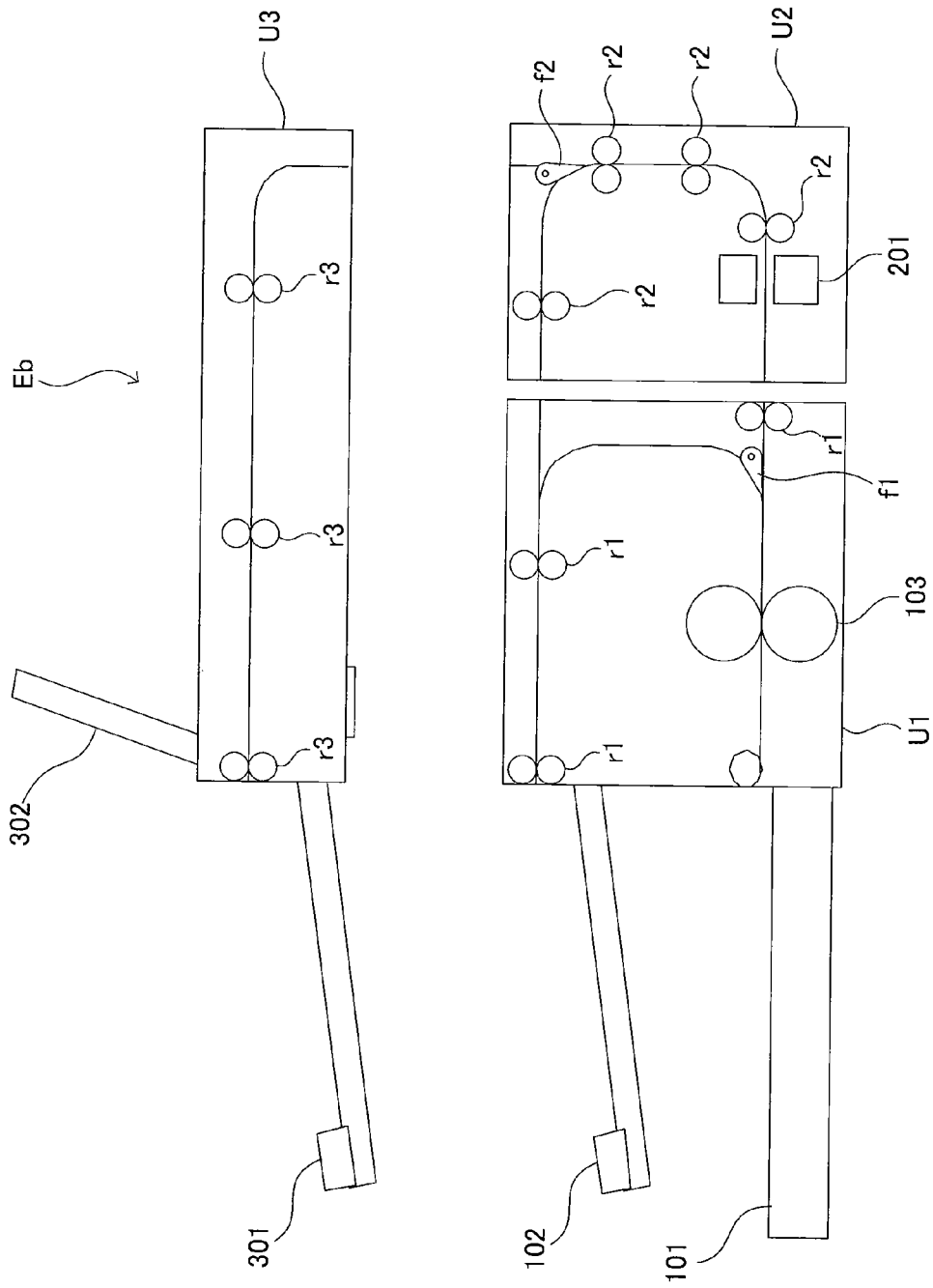
FIG. 6 illustrates a vertical cross-sectional diagram of an outline configuration of a decoloring device Eb according to a Second Embodiment.

FIG. 6 illustrates a vertical cross-sectional diagram of an outline configuration of a decoloring device Eb according to the Second Embodiment.

The basic configuration of the decoloring device Eb of the Second Embodiment is the same as the decoloring device E of the First Embodiment.

In the Second Embodiment, the unit U1 and the unit U2 correspond to "the first unit" and the unit U3 corresponds to "the second unit".

The first unit includes "the first sheet carrying path" that leads a sheet that is supplied from the sheet supply tray 101 to the sheet discharge tray 102, and "the second sheet carrying path" that is a carrying path that diverges from the first sheet carrying path and that leads a sheet that the decoloring section 103 decolors to the unit U2 (separation section).

The second unit is a unit that is attachable to and detachable from the first unit as one of a plurality of discharge destinations of a sheet that is separated and discharged in the unit U2 (separation section), and includes the second sheet discharge tray 301 that discharges the separated and discharged sheets.

In the example illustrated in FIG. 6, a state in which the second unit is removed from the first unit is illustrated.

Figure 7:
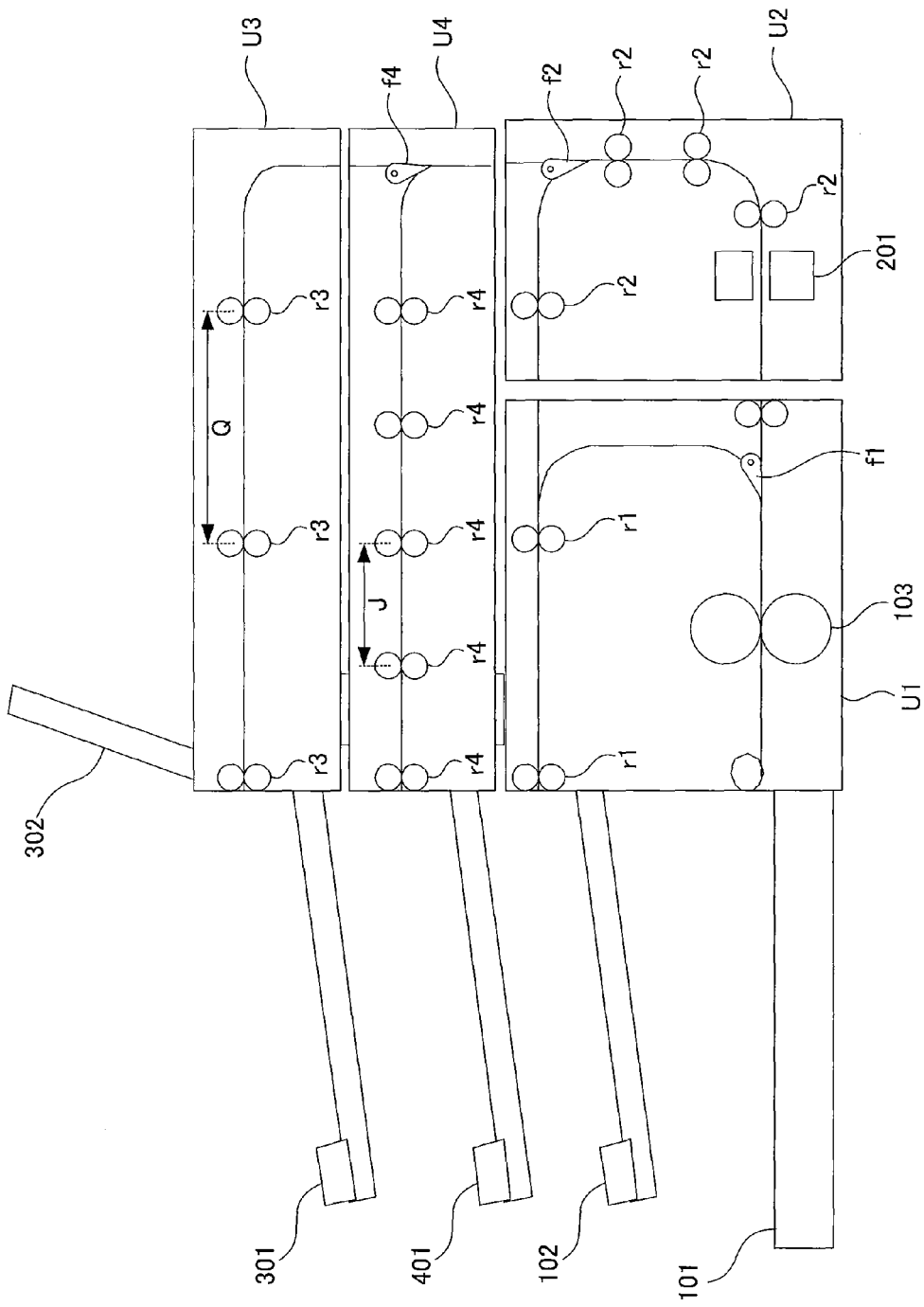
FIG. 7 illustrates a diagram of a configuration in which a third unit is further equipped between a first unit and a second unit.

FIG. 7 illustrates a diagram of a configuration in which a third unit is further equipped between the first unit and the second unit. In FIG. 7, a unit U4 corresponds to "the second unit" and the unit U3 corresponds to "the third unit".

The unit U4 as "the second unit" includes divergent carrying paths that separate and carry a sheet that enters from "the first unit" to the plurality of discharge destinations.

In addition, "the third unit" includes a carrying path that receives a sheet that is discharged from one of the plurality of divergent carrying paths of "the second unit", and is attachable to and detachable from "the second unit"

Furthermore, an arrangement interval J between carrying rollers r4 in the sheet carrying direction in the unit U4 as "the second unit" is narrower than an arrangement interval Q between each of a carrying roller group in the sheet carrying direction in the third unit.

Generally, when a sheet that is already decolored is separated and discharged by a separation section, it is determined in advance to whichever of any of the sheet discharge trays 102, 301, and 401 a sheet that is not reusable in which the decoloring is unsuccessful is discharged and a sheet that is reusable in which the decoloring is successful is discharged.

Further, ordinarily, from a viewpoint of convenience of operation and a viewpoint of shortening the carrying route, a sheet that is determined to be not reusable is often set to be discharged to a lower discharge tray that is harder to see.

Therefore, the arrangement interval J of the sheet carrying rollers in the unit U4 that includes the sheet discharge tray 401 which often discharges the sheet that is determined to be not reusable is set to be narrower than the arrangement interval in the unit U3 or the like. In so doing, it is possible to improve the sheet carrying ability in the unit U4 which is expected to carry, in particular, sheets that are in a state of being more prone to jamming or the like.

Figure 8:
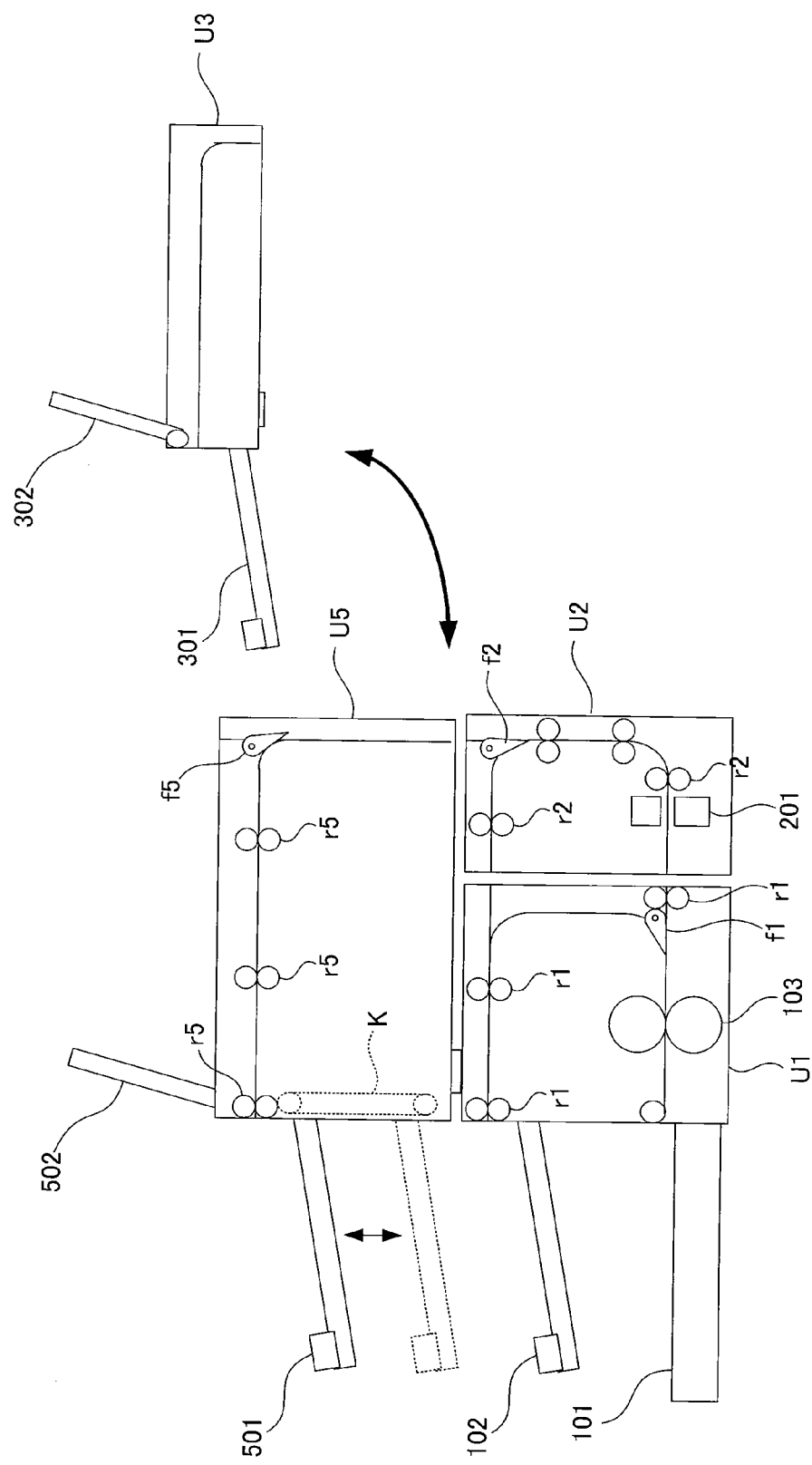
FIG. 8 illustrates a diagram of a state of equipping a unit U5 on which a large amount of sheet loading is possible, instead of a unit U3.

FIG. 8 illustrates a diagram of a state of equipping a unit U5 on which a large amount of sheet loading is possible, instead of the unit U3.

As illustrated in the drawing, the unit U5 is able to be equipped instead of the unit U3.

The unit U5 is able to load a large number of sheets compared to the unit U3, and a sheet loading tray 501 is movable upward and downward by an ascending and descending mechanism K.

Figure 9:
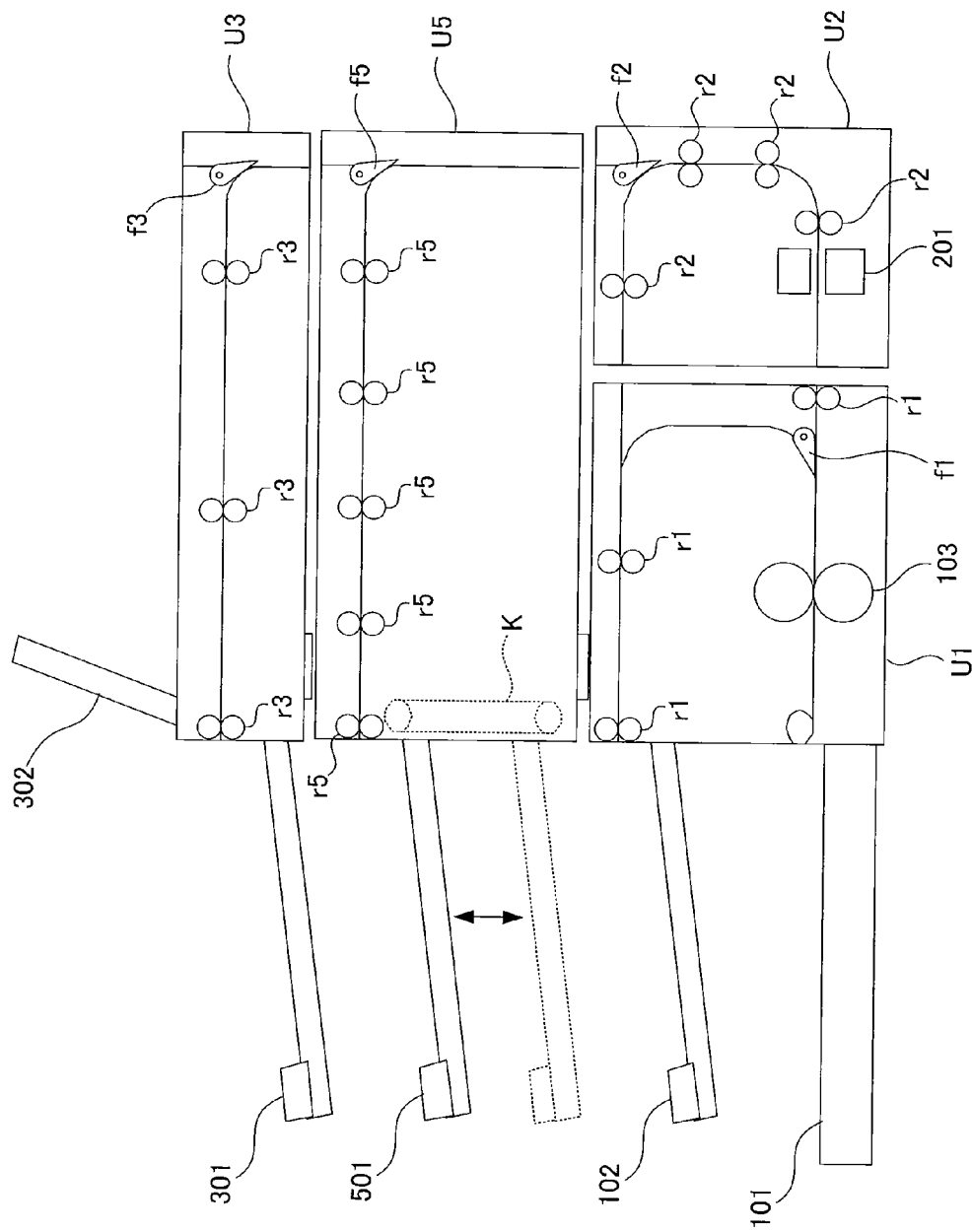
FIG. 9 illustrates a diagram of a state of equipping the unit U5 on which a large amount of sheet loading is possible, between the unit U3 and a unit U1 and a unit U2.

FIG. 9 illustrates a diagram of a state of equipping the unit U5 on which a large amount of sheet loading is possible, between the unit U3 and the unit U1 and the unit U2.

Here, in the example illustrated in FIG. 9, the arrangement interval between carrying rollers r5 is set to be narrower than the arrangement interval in the unit U3 or the like.

Figure 10:
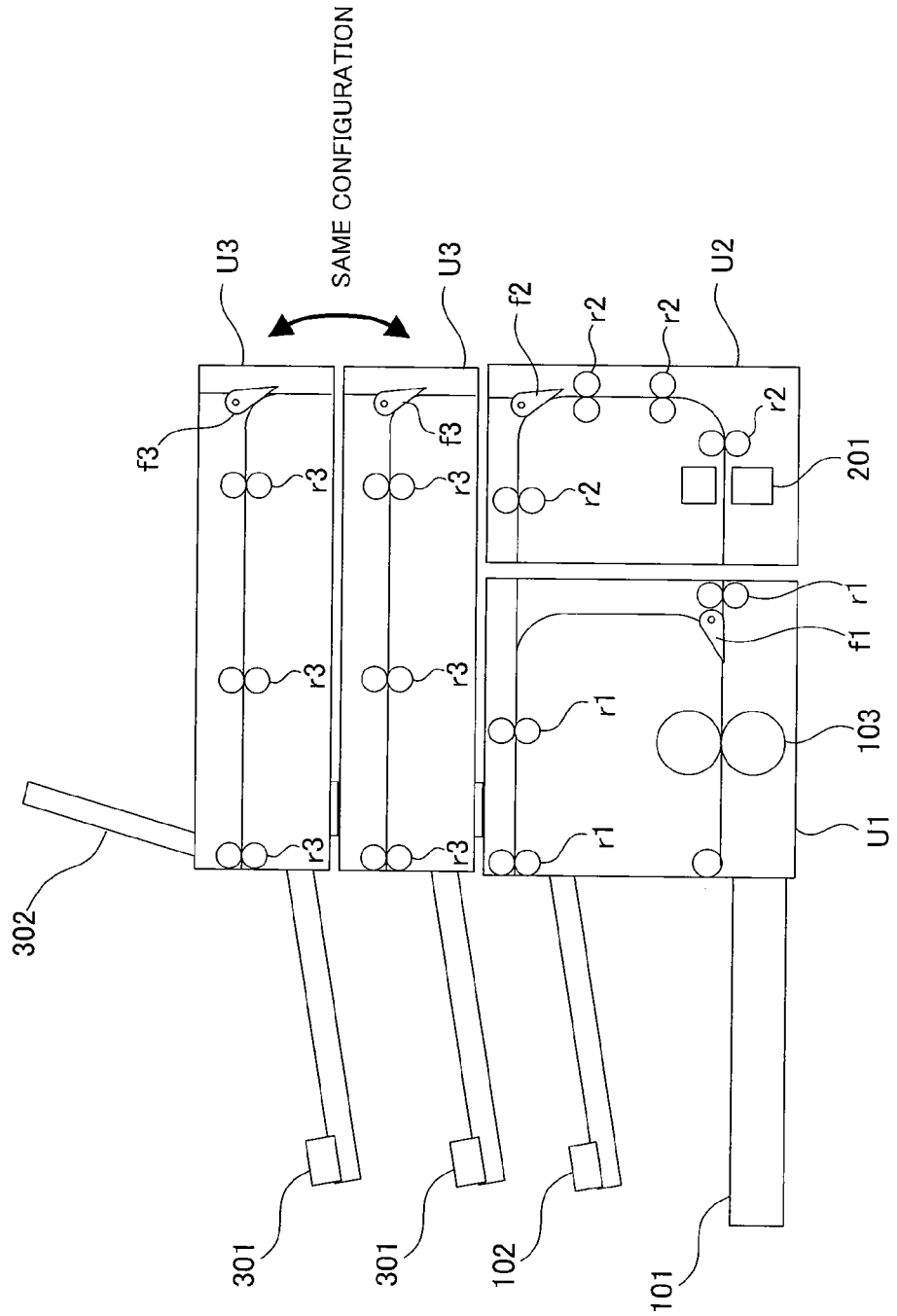
FIG. 10 illustrates a diagram of a state of further equipping another unit U3 between the unit U3 and the unit U1 and the unit U2.

FIG. 10 illustrates a diagram of a state of further equipping another unit U3 between the unit U3 and the unit U1 and the unit U2.

Figure 11:
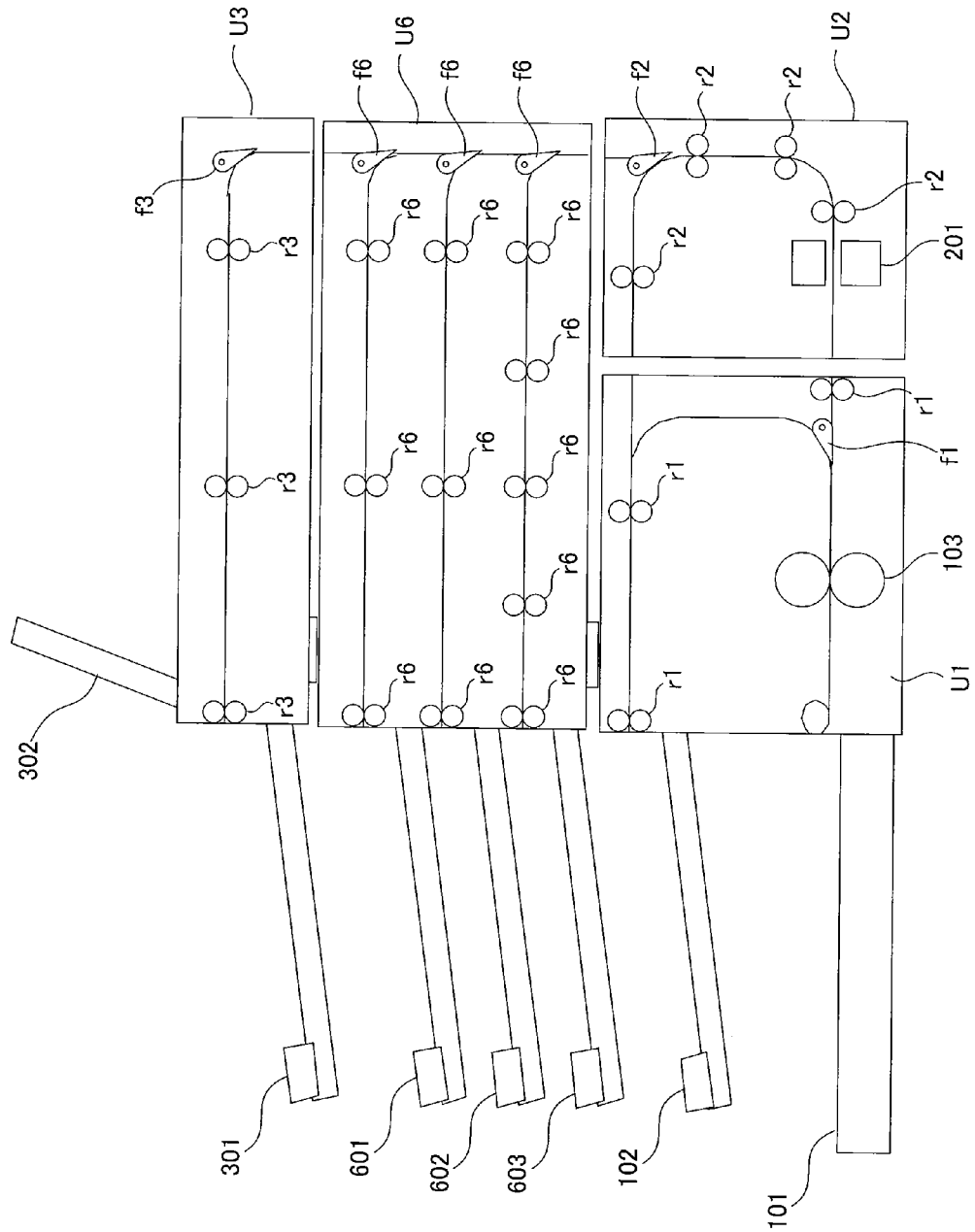
FIG. 11 illustrates a diagram of a state of equipping a unit U6 between the unit U3 and the unit U1 and the unit U2.

FIG. 11 illustrates a diagram of a state of equipping a unit U6 between the unit U3 and the unit U1 and the unit U2.

The unit U6 (the second unit) includes the divergent carrying paths that separate and carry a sheet that enters from the unit U2 to a plurality of discharge destinations, and a plurality of sheet discharge trays 601 to 603, each of which receives sheets that are respectively discharged from the divergent carrying paths.

Figure 12:
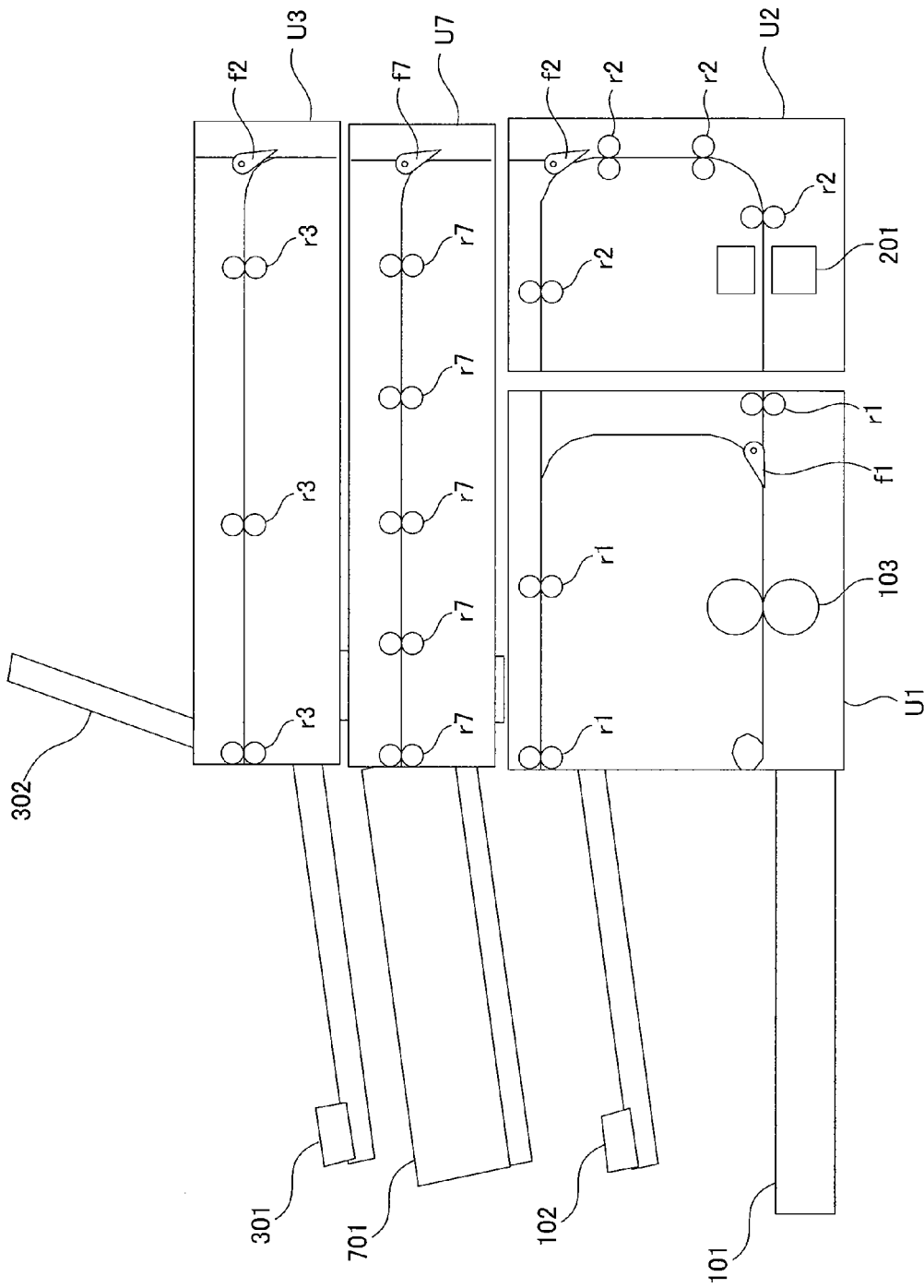
FIG. 12 illustrates a diagram of a state of equipping a unit U7 that includes a high-capacity tray 701 between the unit U3 and the unit U1 and the unit U2.

FIG. 12 illustrates a diagram of a state of equipping a unit U7 that includes a high-capacity tray 701 between the unit U3 and the unit U1 and the unit U2.

In such a manner, by the units that include desired functions having an attachable and detachable configuration, the convenience of the separation process after decoloring is able to be improved.

According to the Second Embodiment as described above, techniques such as, for example, (1) to (5) below are able to be provided.

(1) A Decoloring Device Including:

a first unit that includes a sheet supply tray, a sheet discharge tray, a first sheet carrying path that leads a sheet that is supplied from the sheet supply tray to the sheet discharge tray, a decoloring section that decolors an image that is formed by a decolorable colorant on the sheet that is carried on the first sheet carrying path, a separation section that separates and discharges the sheet that the decoloring section decolors to any of a plurality of discharge destinations, a second sheet carrying path that is a carrying path that diverges from the first sheet carrying path and that leads the sheet that the decoloring section decolors to the separation section, and a flapper that switches a carrying destination of the sheet that passes through the decoloring section to a discharge opening on the first sheet carrying path or to the separation section; and a second unit that is attachable to and detachable from the first unit as one of the plurality of discharge destinations to which the separation section separates and discharges the sheet, and that includes a second sheet discharge tray that discharges the sheet that is separated and discharged.

(2) The Device According to (1), wherein the second unit includes divergent carrying paths that separate and carry a sheet that enters from the first unit to a plurality of discharge destinations and a plurality of sheet discharge trays, each of which receives sheets that are respectively discharged from the divergent carrying paths.

(3) The Device According to (1), wherein the second unit includes divergent carrying paths that separate and carry a sheet that enters from the first unit into a plurality of discharge destinations, and on which a third unit that includes a carrying path that receives a sheet that is discharged from any one of the plurality of divergent carrying paths is attachable and detachable.

(4) The Device According to (3), wherein the second unit and the third unit have the same configuration.

(5) The Device According to (3), wherein an arrangement interval between carrying roller groups in the sheet carrying direction of the second unit is narrower than the arrangement interval between carrying roller groups in the sheet carrying direction of the third unit.

Third Embodiment

P1B105018-1 Deletion and Separation Device

Next, a Third Embodiment will be described with reference to the drawings. The Third Embodiment is a modification example of each of the embodiments described above, and the basic device configurations thereof are the same. Below, parts that have the same functions as described in the embodiments above are given the same reference numerals, and the description thereof will be omitted.

In the related art, an integrated machine that decolors an image on a sheet that is image formed by a decolorable colorant and that determines the outcome of the decoloring by scanning the image of the sheet after decoloring is proposed.

However, in the integrated machine described above, the size of the device is increased, and in addition, unnecessary functional portions are provided together to a user that only desires a decoloring function.

Therefore, as shown in the embodiments described above, in the decoloring device according to the Third Embodiment, the unit U1 that is able to perform decoloring independently and the unit U2 that separates and carries a sheet that receives decoloring by the unit U1 to any of a plurality of predetermined carrying destinations are separately attachable and detachable.

Figure 13:
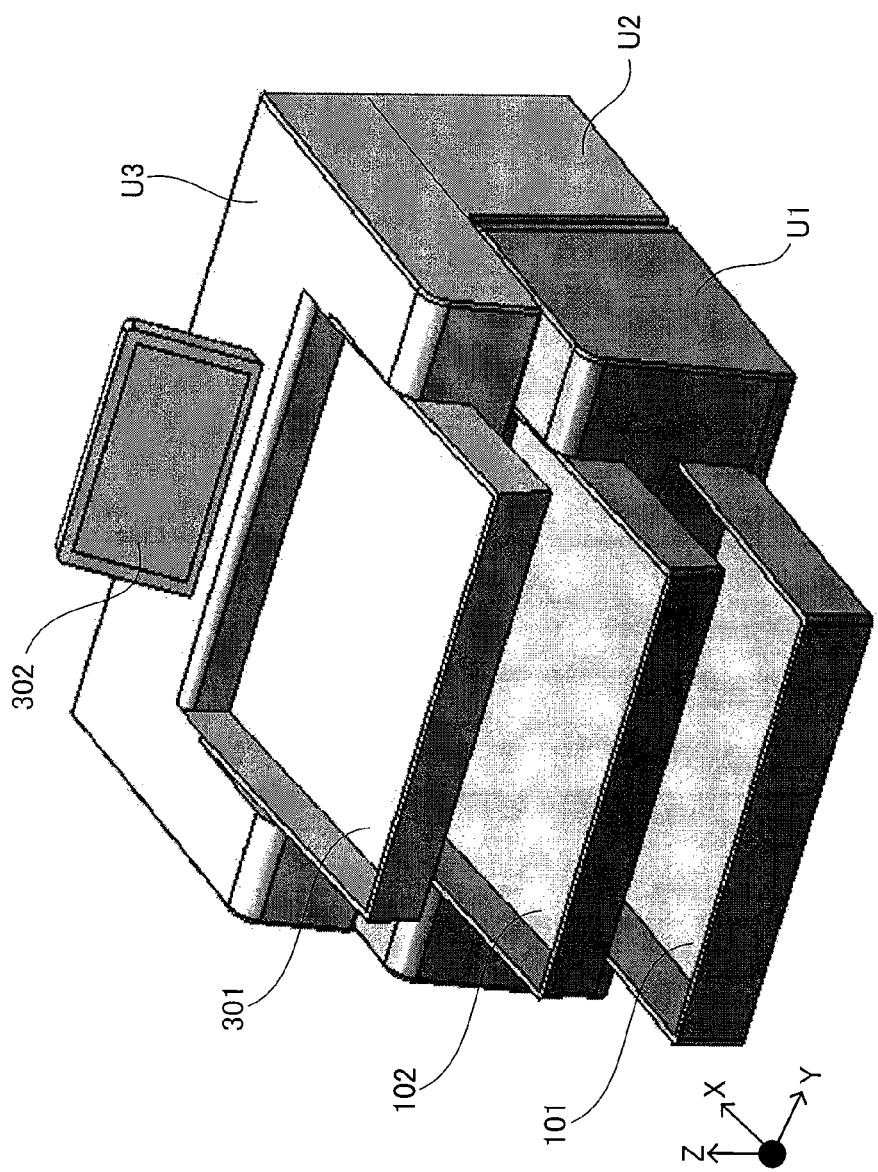
FIG. 13 illustrates a diagram of a state in which a display section 302 is equipped.
Figure 14:
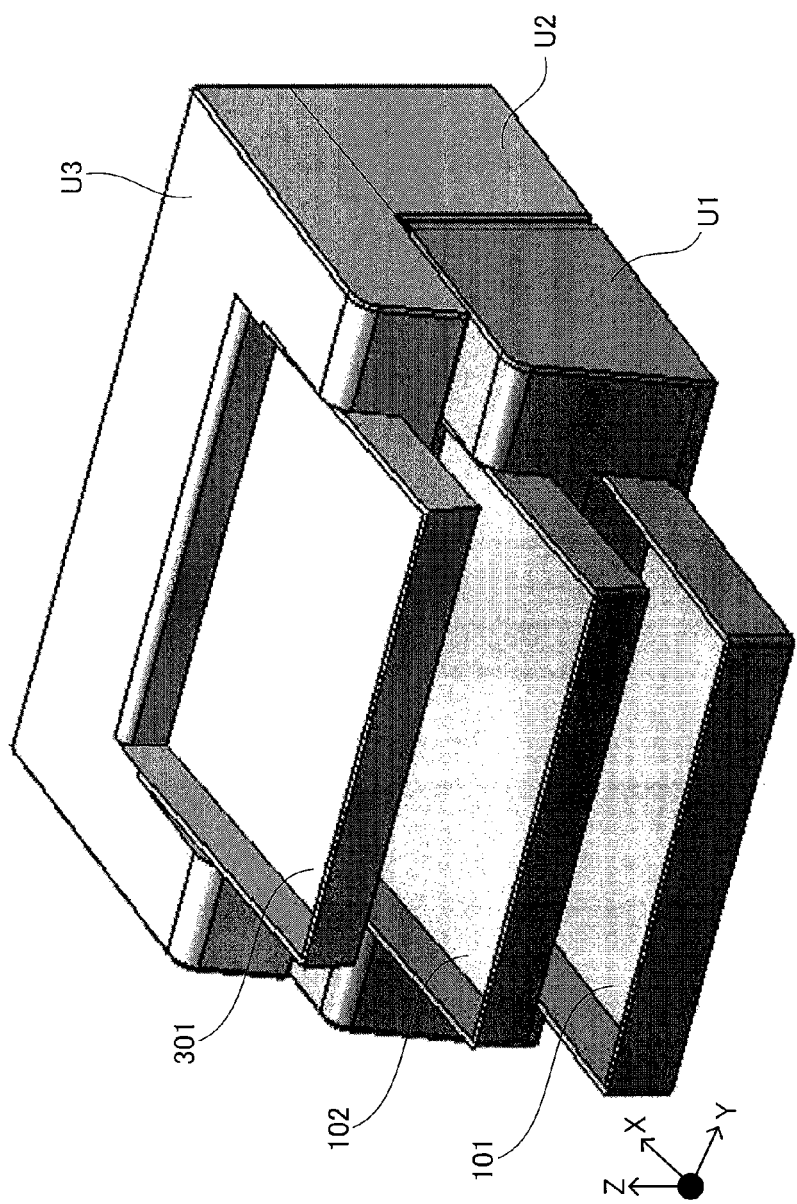
FIG. 14 illustrates a diagram of a state in which the display section 302 is removed.

Furthermore, in the Third Embodiment, in addition to the configuration of the First Embodiment, the display section 302 is attachable to and detachable from the unit U3. FIG. 13 illustrates a state in which the display section 302 is equipped, and FIG. 14 illustrates a state in which the display section 302 is removed.

Here, the unit U1 of FIG. 1 corresponds to "the decoloring unit". Further, the unit U2 of FIG. 1 corresponds to "the separation unit".

Furthermore, the carrying path that merges with the sheet carrying path PATH6 of the unit U2 in FIG. 1 corresponds to "a merging path".

In addition, in the Third Embodiment, the unit U1 (decoloring unit) and the unit U2 (separation unit) are able to operate mutually independently. Here, it is desirable that "able to operate independently" denote not only that the unit U1 and the unit U2 are able to operate independently when coupled, but also that each unit is able to operate independently when the unit U2 is removed from the unit U1. In such a case, each unit U1 to U3 respectively includes a PROCESSOR, an ASIC, a MEMORY, and an HDD.

According to the Third Embodiment as described above, techniques such as, for example, (1) to (4) below are able to be provided.

(1) A Decoloring Device Including:

a separation unit that includes a separation section that separates and discharges a sheet that is decolored to any of a plurality of discharge destinations; and a decoloring unit that includes a sheet supply tray, a sheet discharge tray, a first sheet carrying path that leads a sheet that is supplied from the sheet supply tray to the sheet discharge tray, a decoloring section that decolors an image that is formed by a decolorable colorant on the sheet that is carried on the first sheet carrying path, a second sheet carrying path that is a carrying path that diverges from the first sheet carrying path and that leads the sheet that the decoloring section decolors to the separation unit, and a flapper that switches a carrying destination of the sheet that passes through the decoloring section to a discharge opening on the first sheet carrying path or to the separation unit.

(2) The Device According to (1), Further Including:

a display section that is attachable to and detachable from the decoloring device, and that performs screen display that shows processing contents of the decoloring device.

(3) The Device According to (1), wherein the decoloring unit further includes a merging path that merges a sheet that is brought in from a supply opening on the separation unit side to the first sheet carrying path, and the separation device includes divergent paths for separating and carrying a sheet to the merging path as one of the plurality of discharge destinations.

(4) The Device According to (1), wherein the decoloring unit and the separation unit are able to operate mutually independently.

Fourth Embodiment

P1B107034-1 Deletion and Separation Device

Next, a Fourth Embodiment will be described with reference to the drawings. The Fourth Embodiment is a modification example of each of the embodiments described above, and the basic device configurations thereof are the same.

Below, parts that have the same functions as described in the embodiments above are given the same reference numerals, and the description thereof will be omitted.

In the related art, a decoloring device that includes a decoloring section that decolors an image formed on a sheet of paper and a determination section such as a scanner that determines whether or not decoloring is applied normally and determines whether reuse is possible is known.

In the decoloring device of the related art described above, sheet supply positions and sheet discharge positions in the device are decided in advance, and it is not possible to adjust the sheet supply positions or the sheet discharge positions according to height positions that are set, such as when the device is installed at a high position on a desk or when the device is placed on the floor.

Figure 15:
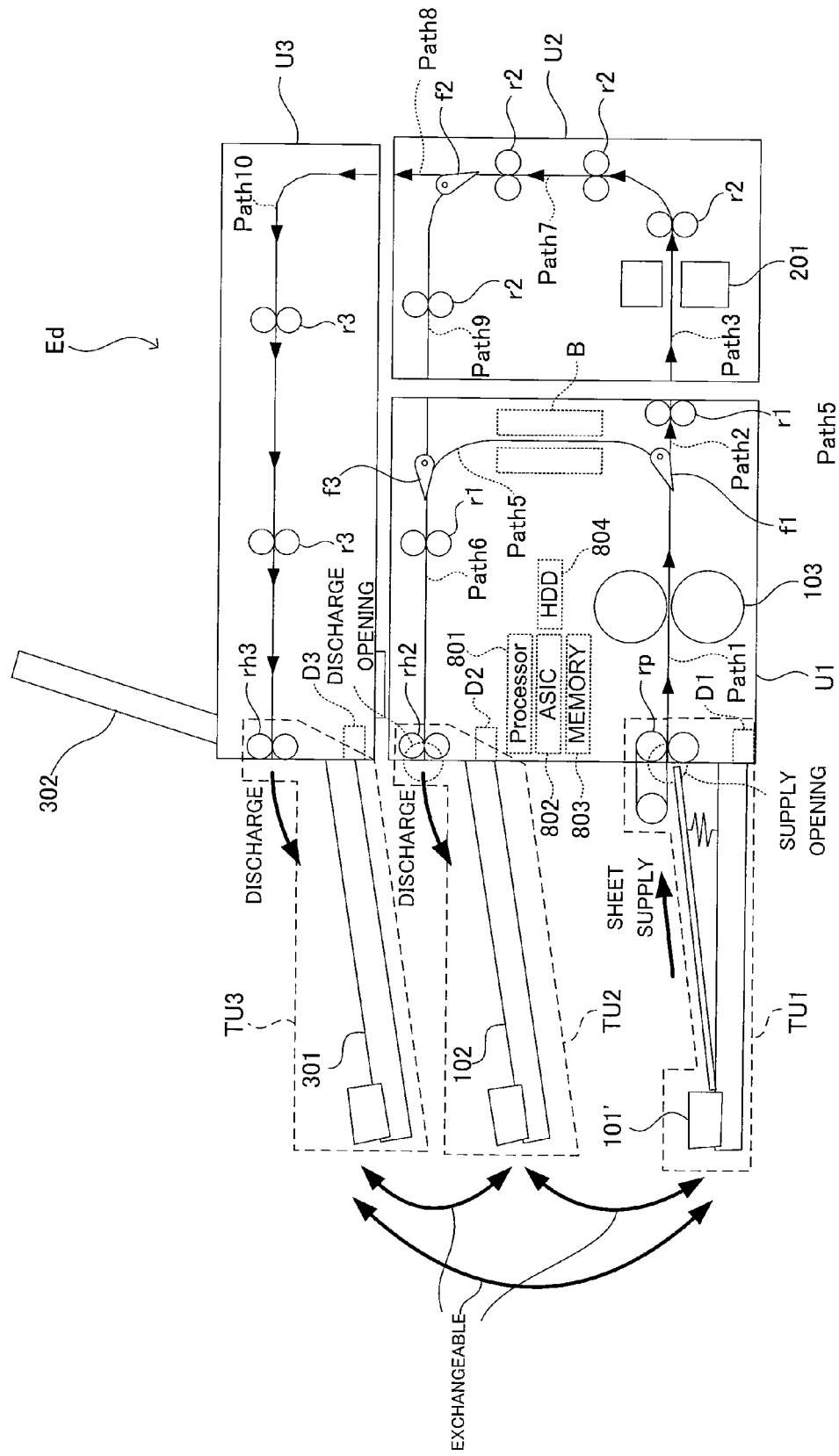
FIG. 15 illustrates a vertical cross-sectional diagram of an outline configuration of a decoloring device Ed of a Fourth Embodiment.

FIG. 15 illustrates a vertical cross-sectional diagram of an outline configuration of a decoloring device Ed of the Fourth Embodiment.

The decoloring device Ed according to the Fourth Embodiment has a configuration that is different to each of the embodiments described above, for example, on the following points.

(a) A sheet supply unit TU1, a sheet discharge unit TU2, and a sheet discharge unit TU3 are mutually exchangeable.

(b) The decoloring section, the carrying rollers, and a pickup roller are forwardly and reversely rotatable, and sheet carrying in both directions is possible in the sheet carrying paths.

(c) A flapper f3 is provided at a diverging point where no flapper is provided in each of the embodiments described above, as the diverging point is a merging point of the sheet carrying paths.

In the state illustrated in FIG. 15, the sheet discharge unit TU3, the sheet discharge unit TU2, and the sheet supply unit TU1 are equipped in that order from the top, on a decoloring device main body.

The sheet discharge unit TU3 includes, for example, the sheet discharge tray 301, a discharge roller rh3, and the like to be integrally attachable to and detachable from the decoloring device.

The sheet discharge unit TU2 includes, for example, the sheet discharge tray 102, a discharge roller rh2, and the like to be integrally attachable to and detachable from the decoloring device.

The sheet supply unit TU1 includes, for example, the sheet supply tray 101, a pickup roller rp, and the like to be integrally attachable to and detachable from the decoloring device.

On a side surface of the main body of the decoloring device Ed on which each of the units TU1 to TU3 is attached and detached includes an attachment mechanism that is able to attach and detach such units. Here, various known mechanisms are able to be adopted as the attachment mechanism that couples each of the units TU1 to TU3 to the decoloring device main body.

In addition, the PROCESSOR 801 performs driving control of the carrying rollers r1 to r3, the discharge roller rh2, the discharge roller rh3, the pickup roller rp, and the like of each of the units U1 to U3.

The PROCESSOR 801 performs, according to a equipping state of each of the units TU1 to TU3 to the decoloring device main body, control of the rotation direction of the carrying rollers r1 to r3, and of the operations of each of the flappers f1 to f3, of each of the units U1 to U3.

The decoloring device main body includes attachment detection sensors D1 to D3, whereby what sort of unit is respectively equipped on attachment portions is detectable. The PROCESSOR 801 automatically recognizes the units that are actually equipped on the decoloring device main body based on detection results by the attachment detection sensors D1 to D3.

When each of the units TU1 to TU3 is in an equipping state as illustrated in FIG. 15, the PROCESSOR 801 causes each carrying roller to be driven to perform carrying of a sheet in the direction of arrows as illustrated in FIG. 15.

Figure 16:
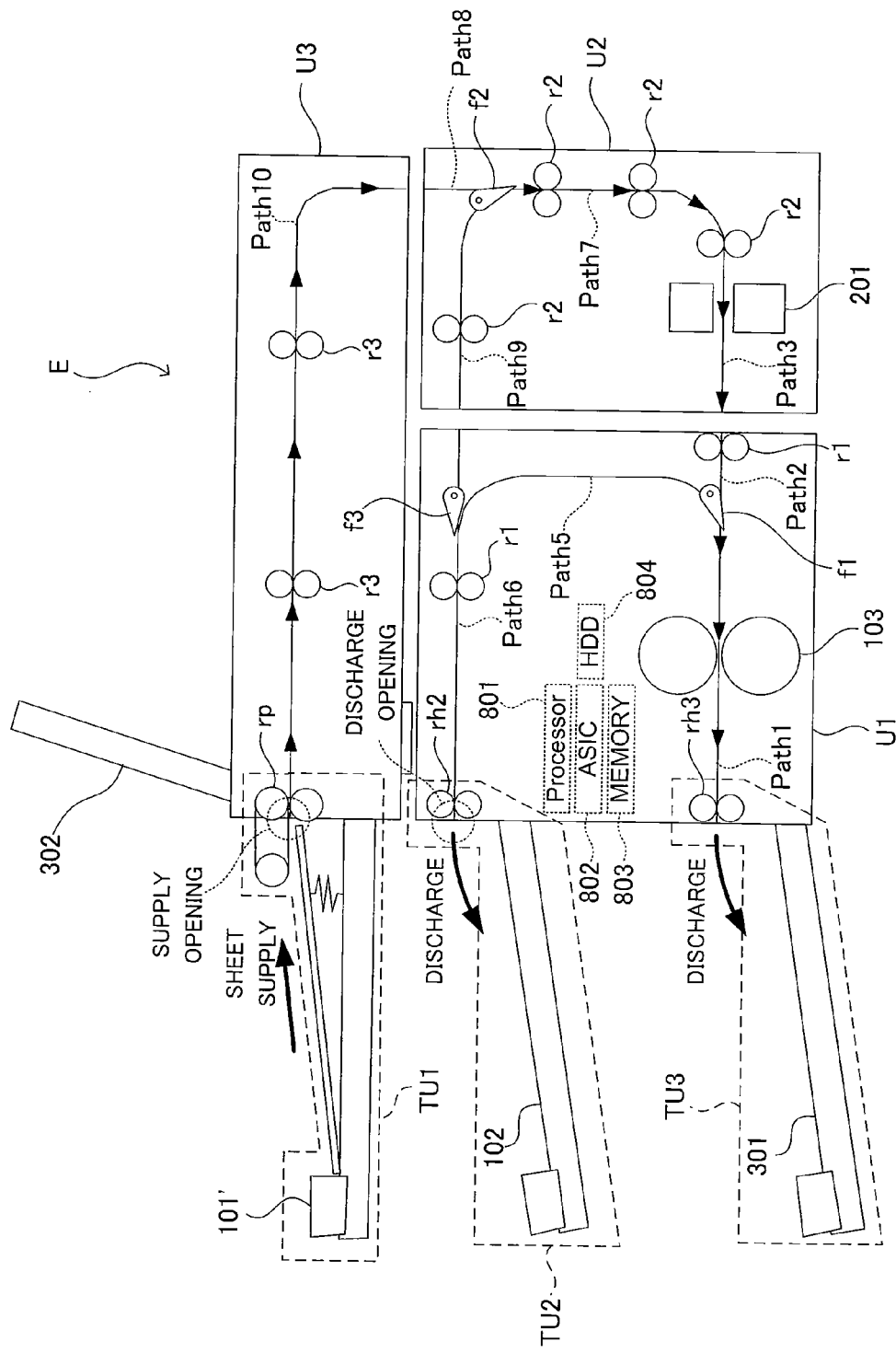
FIG. 16 illustrates a diagram of other equipping states of each unit TU1 to TU3.

On the other hand, when each of the units TU1 to TU3 is in an equipping state as illustrated in FIG. 16, the PROCESSOR 801 causes each carrying roller to be driven to perform carrying of a sheet in the direction of arrows as illustrated in FIG. 16 which is the opposite direction to the direction illustrated in FIG. 15.

Here, in the present embodiment, although a configuration in which the sheet discharge unit TU3 integrally includes the discharge roller rh3, the sheet discharge unit TU2 integrally includes the discharge roller rh2, and the sheet supply unit TU1 integrally includes the pickup roller rp is exemplified, the embodiment is not limited thereto, and the discharge roller rh3, the discharge roller rh2, and the pickup roller rp may respectively be removable independently from each of the units. In such a case, the trays have a configuration of being usable for discharging sheets or for supplying sheets.

Here, although a configuration in which the decoloring section 103 is arranged on the sheet carrying path Path1 is exemplified in FIGS. 15 and 16, without limiting thereto, the decoloring device may be arranged on the sheet carrying path Path5 as illustrated by a broken line B in FIG. 15.

According to the Fourth Embodiment, it is possible to switch equipping positions of the sheet supply tray and the sheet discharge trays according to the location at which the decoloring device is arranged or the way that the decoloring device is used, contributing to an improvement in the convenience of the device.

According to the Fourth Embodiment as described above, techniques such as, for example, (1) to (3) below are able to be provided.

(1) A Decoloring Device Including:

a sheet carrying path that leads a sheet that is supplied from a first opening to a second opening;

a plurality of carrying rollers, each of which is arranged in a line along a sheet carrying direction of the sheet carrying path;

a decoloring section that decolors an image that is formed by a decolorable colorant on the sheet that is carried on the first sheet carrying path;

a sheet supply tray that is attachable to and detachable from both the first opening and the second opening and that provides a sheet to the sheet carrying path;

a sheet discharge tray that is attachable to and detachable from both the first opening and the second opening and that receives a sheet that is discharged from the sheet carrying path; and a driving control section that is able to rotate the carrying rollers forwards and backwards.

(2) The Device According to (1), further including an attachment detection sensor that detects whether any tray is equipped on the first and second openings, wherein the driving control section drives the plurality of carrying rollers such that a sheet is carried from an opening, out of the first and second openings, that is detected to have the sheet supply tray equipped by the attachment detection sensor toward an opening that is detected to have the sheet discharge tray equipped by the attachment detection sensor.

(3) The Device According to (1), wherein the sheet supply tray further includes a pickup roller for providing a sheet to the sheet carrying path to be integrally attachable to and detachable from a decoloring device main body, the sheet discharge tray includes a discharge roller for discharging a sheet from the sheet carrying path onto the sheet discharge tray to be integrally attachable to and detachable from the decoloring device main body.

While certain embodiments have been described, these embodiments have been presented byway of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:

1. A decoloring device comprising:
a first sheet carrying path that leads a sheet that is provided from a supply opening to a discharge opening;
a decoloring section that decolors an image that is formed by a decolorable colorant on the sheet that is carried on the first sheet carrying path;
a second sheet carrying path that is a carrying path that diverges from the first sheet carrying path, and that leads the sheet that the decoloring section decolors to a separation device that separates and discharges the sheet to any of a plurality of discharge the sheet destinations;
a flapper that switches a carrying destination of the sheet that passes through the decoloring section to the discharge opening on the first sheet carrying path or the separation device;
a route control section that switches, by switching the flapper, the carrying destination of the sheet that passes through the decoloring section to either the discharge opening or the separation device;
a malfunction detection section that determines a presence or absence of a malfunction in each of the decoloring section and the separation device; and
a function management section that causes, when the malfunction determination section determines that either one of the decoloring section and the separation device is malfunctioning, only the other to be executable.

2. The device according to claim 1,
wherein the route control section switches the flapper, when the malfunction determination section determines that the separation device is malfunctioning, such that the sheet that the decoloring section decolors is carried toward the discharge opening, and prohibits entry of the sheet to the second sheet carrying path.

3. The device according to claim 1,
wherein the route control section switches the flapper, when the malfunction determination section determines that the decoloring section is malfunctioning, such that the sheet that the decoloring section decolors is carried toward the separation device.

4. The device according to claim 1, further comprising:
a display section that performs a display relating to a processing content of the decoloring device; and
a display control section that displays on the display section, when the malfunction determination section determines that one of the decoloring section and the separation device is malfunctioning, at least one function that is executable without receiving an influence of a malfunction of the malfunctioning location.

5. The device according to claim 4, further comprising:
an operation input section that receives an operation input by a user,
wherein the function management section causes, when an operation input to select any of one or more functions that are executable and are displayed on the display section by the display control section is received, only a selected function to be executed.

6. A decoloring device comprising:
a first sheet carrying unit configured to lead a sheet that is supplied from a supply opening to a discharge opening;
a decoloring unit configured to decolor an image that is formed by a decolorable colorant on the sheet that is carried on the first sheet carrying unit;
a second sheet carrying unit that is a carrying unit that is configured to diverge from the first sheet carrying unit, and to lead the sheet that the decoloring unit decolors to a separation device that separates and discharges the sheet to any of a plurality of discharge destinations;
a flapper that switches a carrying destination of the sheet that passes through the decoloring unit to the discharge opening on the first sheet carrying unit or the separation device;
a route control unit configured to switch, by switching the flapper, the carrying destination of the sheet that passes through the decoloring unit to either the discharge opening or the separation device;
a malfunction determination unit configured to determine a presence or absence of a malfunction in each of the decoloring unit and the separation device; and
a function management unit configured to cause, when the malfunction determination unit determines that either one of the decoloring unit and the separation device is malfunctioning, only the other to be executable.

7. The device according to claim 6,
wherein the route control unit switches the flapper, when the malfunction determination unit determines that the separation device is malfunctioning, such that the sheet that the decoloring unit decolors is carried toward the discharge opening, and prohibits entry of the sheet to the second sheet carrying unit.

8. The device according to claim 6,
wherein the route control unit switches the flapper, when the malfunction determination unit determines that the decoloring unit is malfunctioning, such that the sheet that the decoloring unit decolors is carried toward the separation unit.

9. The device according to claim 6, further comprising:
a display unit that performs a display relating to a processing content of the decoloring device; and
a display control unit that displays on the display unit, when the malfunction determination unit determines that one of the decoloring unit and the separation device is malfunctioning, at least one function that is executable without receiving an influence of a malfunction of the malfunctioning location.

10. The device according to claim 9, further comprising:
an operation input unit configured to receive an operation input by a user,
wherein the function management unit causes, when an operation input to select any of one or more functions that are executable and are displayed on the display unit by the display control unit is received, only a selected function to be executed.

11. A function management method of a decoloring device that includes a decoloring section that decolors an image that is formed by a decolorable colorant on a sheet that is carried on a first sheet carrying path that leads a sheet supplied from a supply opening to a discharge opening, a second sheet carrying path that is a carrying path that diverges from the first sheet carrying path, and that leads the sheet that the decoloring section decolors to a separation device that separates and discharges the sheet to any of a plurality of discharge destinations, a route control section that is positioned further to an upstream side than a diverging position on the first sheet carrying path and that switches, by switching a flapper based on image data that is read by a scanner that reads an image on the sheet that is decolored, a carrying destination of the sheet that passes through the decoloring section to either the discharge opening or the separation device, the method comprising:

determining a presence or absence of a malfunction in each of the decoloring section and the separation device; and when it is determined that either one of the decoloring section or the separation device is malfunctioning, causing only the other to be executable.

12. The method according to claim 11, wherein when the separation device is determined to be malfunctioning, the flapper is switched such that the sheet that the decoloring section decolors is carried toward the discharge opening, and entry of the sheet to the second sheet carrying path is prohibited.

13. The method according to claim 11, wherein when the decoloring section is determined to be malfunctioning, the flapper is switched such that the sheet that the decoloring section decolors is carried toward the separation device.

14. The method according to claim 11, wherein when either one of the decoloring section and the separation device is determined to be malfunctioning, at least one function that is executable without receiving an influence of a malfunction of the malfunctioning location is caused to be displayed.

15. The method according to claim 14, wherein when an operation input to select any of one or more displayed functions that are executable is received, only a selected function is caused to be executed.

* * * * *